United States Patent [19]
Buse et al.

[11] Patent Number: 6,157,470
[45] Date of Patent: *Dec. 5, 2000

[54] NON-VOLATILE HOLOGRAPHIC STORAGE IN DOUBLY-DOPED PHOTOREFRACTIVE MATERIAL

[75] Inventors: Karsten Buse, Ghhuette, Germany; Ali Adibi; Demetri Psaltis, both of Pasadena, Calif.

[73] Assignee: California Institute of Technology, Pasadena, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/260,523

[22] Filed: Feb. 25, 1999

Related U.S. Application Data

[60] Provisional application No. 60/076,150, Feb. 26, 1998.

[51] Int. Cl.[7] .............................. G03H 1/02; G03H 1/04; G11C 11/22
[52] U.S. Cl. .................................. 359/7; 359/3; 365/117; 365/125; 365/216; 430/1; 430/2
[58] Field of Search .................................. 359/3, 4, 7, 27; 365/125, 216, 117; 430/1, 2

[56] References Cited

U.S. PATENT DOCUMENTS

| | | |
|---|---|---|
| 3,799,642 | 3/1974 | Phillips et al. . |
| 5,440,669 | 8/1995 | Rakuljic et al. . |
| 5,460,907 | 10/1995 | Ducharme et al. . |
| 5,648,856 | 7/1997 | Stoll ........................................... 359/7 |
| 5,665,493 | 9/1997 | Bai et al. . |
| 5,684,611 | 11/1997 | Rakuljic et al. . |
| 5,698,344 | 12/1997 | Bai et al. . |
| 5,699,175 | 12/1997 | Wilde .......................................... 359/7 |
| 5,739,929 | 4/1998 | Macfarlane ................................ 359/7 |
| 5,864,412 | 1/1999 | Wilde . |

OTHER PUBLICATIONS

"Holographic Storage In Electrooptic Crystals. I. Steady State", N. V. Kukhtarev, et al., Ferroelectrics, 1979, vol. 22, pp. 949–960.

"Two–color holography in reduced near–stoichiometric lithium niobate", Harald Guenther, et al., 1998 Optical Society of America, vol. 37, No. 32 pp. 7611–7623.

Primary Examiner—Jon Henry
Attorney, Agent, or Firm—Fish & Richardson P.C.

[57] ABSTRACT

A non-volatile holographic recording method and system based on a doubly-doped photorefractive material. One embodiment of the holographic material is doped to have first and second types of dopants that are operable to produce charge carriers to a common band in response to radiation of a specified wavelengths. Charge carriers in the common band can migrate to a different spatial location. The dopants are also capable of recombining with charge carriers in the common band. The first type of dopants have a first dopant energy level below the band by a first energy gap greater than a second energy gap of a second dopant energy level of the second type of dopants below the common band. The first and second dopant energy levels are separated from each other so that their absorption bands to the common band are substantially separated. In addition, the first and second energy gaps should be much greater than the thermal energy $k_BT$ associated with the operating temperature T in order to substantially reduce or minimize the probability of thermal excitation of charge carriers.

26 Claims, 8 Drawing Sheets

NON-VOLATILE HOLOGRAPHIC STORAGE IN DOUBLY-DOPED PHOTOREFRACTIVE MATERIAL

This application claims the benefit of U.S. Provisional Application No. 60/076,150, filed on Feb. 26, 1998.

FIELD OF THE INVENTION

The present invention relates to optical holograms and optical data storage, and more specifically, to holographic data storage in photorefractive materials.

BACKGROUND

Optical holographic materials can be used for high-density data storage and high-speed data processing in both digital and analog forms. Information is stored in a holographic material in form of holograms. An optical signal beam can be modulated to carry the information to be stored or processed. A reference beam, which is coherent with the signal beam and provides a substantially homogeneous illumination, overlaps with the signal beam in the holographic material to produce an optical interference pattern. The holographic material responds to the interference pattern and produces a hologram as a spatial variation in the index of refraction that replicates the interference pattern. To retrieve the information, a readout beam is used to illuminate the holographic material and is diffracted by the recorded hologram to produce a reconstruction beam. The reconstruction beam is then detected to retrieve the recorded information.

Photorefractive materials are one class of widely-used holographic materials. A photorefractive material has spatially-distributed photorefractive centers capable of producing charge carriers (e.g., electrons) by absorbing photons. The inhomogeneous illumination caused by the interference pattern of the signal and reference beams excites charge carriers from the photorefractive centers. The charge carriers migrate and become trapped by other photorefractive centers at different locations. Such charge migration and trapping produce a space-charge field that replicates the interference pattern. Due to the electro-optic effect, a spatial variation in the index of refraction is generated to form the hologram. Low optical powers can be used to record holograms through the above photorefractive effect and a high percentage of a readout beam can be diffracted into the reconstruction beam to achieve a high diffraction efficiency. Hence, photorefractive materials have been used in many holographic devices including optical storage devices.

The above photorefractive process in many photorefractive materials is reversible and thus can be used to implement rewritable holographic storage. Since the readout beam is a spatially-homogeneous beam, the charge carriers can be redistributed by the readout beam. Hence, the readout process also erases the recorded hologram. However, such volatile readout is undesirable in applications where the recorded information needs to be repetitively accessed.

SUMMARY

The present disclosure describes a holographic device and a holographic storage technique based on the photorefractive effect to provide non-destructive readout. A special recording process is used to record a hologram in a suitable photorefractive material so that the recorded hologram is preserved during repetitive readout. The recorded hologram can be optically erased and can be replaced by a new hologram when desired.

One embodiment of the holographic material is doped to have first and second types of dopants that are operable to produce charge carriers to a common band in response to radiation of specified wavelengths. Charge carriers in the common band, e.g., electrons in the conduction band, can migrate to a different spatial location. The dopants are also capable of recombining with charge carriers in the common band. The first type of dopants have a first dopant energy level below the band by a first energy gap greater than a second energy gap of a second dopant energy level of the second type of dopants below the common band. The first and second dopant energy levels are separated from each other so that their absorption bands to the common band are substantially separated. In addition, the first and second energy gaps should be much greater than the thermal energy $k_B T$ associated with the operating temperature T in order to minimize the probability of thermal excitation of charge carriers.

The doping level of the first type of dopants should be greater than that of the second type of dopants. In a doubly-doped $LiNbO_3$ crystals, the concentration of Mn traps may be about 8–10% of that of the Fe traps in order to achieve a high diffraction efficiency. The $LiNbO_3$ crystal may be annealed so that about 90% of the deeper Mn traps be filled with electrons while the shallower Fe traps are substantially empty.

Radiation beams of two different wavelengths are simultaneously used to illuminate the holographic material during recording. A sensitizing beam of a first wavelength is used to excite charge carriers from both the first and second types of dopants to the common band. At the same time, two mutually coherent writing beams are used to record information in the area illuminated by the sensitizing beam. The writing beams have a second wavelength longer than the first wavelength and excite only charge carriers from the second type of dopants to the common band. A read beam of the second wavelength is used to retrieve the stored information, in absence of the sensitizing beam at the first wavelength. Since this read beam cannot excite charge carriers from the first type of dopants, the hologram formed in the first type of dopants is preserved and cannot erased by the read beam.

The present non-volatile storage has many advantages. For example, the device does not require external electric fields or heating mechanisms to fix the gratings and hence can be implemented with a simple structure. The shallower traps are essentially free of thermal excitation and hence has a relative long lifetime. Therefore, low-power writing beams can be used for recording. Furthermore, during recording, the sensitizing light prevents build-up of both holographically amplified scattered light and screening fields created by accumulation of charge at the boundaries of illuminated regions. During read-out, the crystal is insensitive and cross-talk build-up due to two-wave mixing effects does not occur. Thus the fidelity of the stored information is significantly improved and the error rate drops.

These and other embodiments, aspects and advantages of the invention will become more apparent in light of the following detailed description, including the accompanying drawings and appended claims.

DETAILED DESCRIPTION

The holographic devices and techniques in the present disclosure are based on a special kind of photorefractive materials that are doped to include first and second types of photorefractive centers of different energy levels. Each type of photorefractive centers can exist in two valance states so that centers in one valance state can absorb certain radiation energy to produce charge carriers to the common band (e.g., the conduction band for electrons) and centers in another valance state can recombine with a charge carrier to function as a trap. The energy gap between the energy levels of the two different types of photorefractive centers is large enough so that a monochromatic light in resonance with a transition from the energy level of one type of photorefractive centers to the common band is not resonant with the transition from the energy level of another type of photorefractive centers to the common band.

The doping densities of the two different types of centers are preferably low so that two types of centers essentially do not interact with each other by a non-radiative coupling. In addition, the gaps between energy levels of both types of centers and the common band are much greater than the thermal energy $k_B T$ associated with the operating temperature T to minimize the probability of thermal excitation of charge carriers. Under these conditions, the population distribution of charge carriers in the photorefractive centers can be primarily controlled by the excitations by the external radiation and by the recombination process of the excited charge carriers with the centers. These features of such doubly-doped photorefractive materials can be used to implement a special type of two-step holographic recording and to achieve non-volatile holographic storage.

Figure 1A:
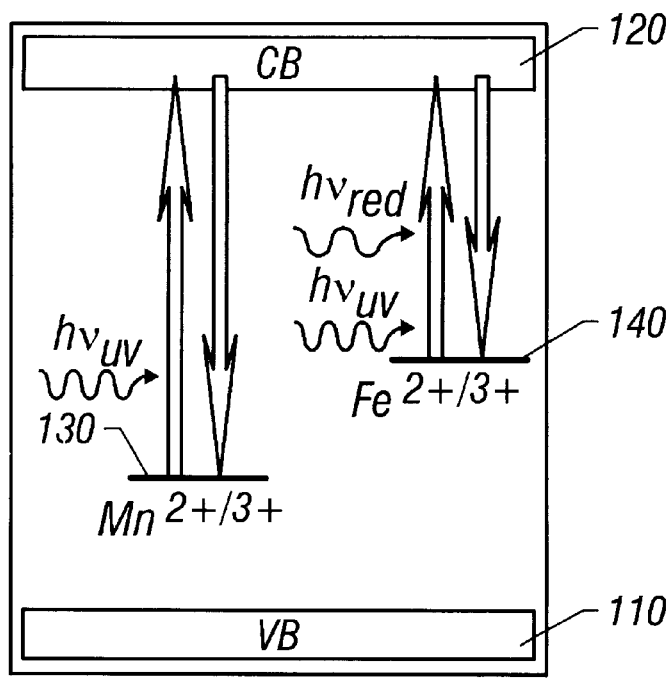
FIG. 1A shows the energy band diagram of a $LiNbO_3$ crystal that is doubly-doped with Fe and Mn traps.

One example of such doubly-doped photorefractive materials is a lithium niobate crystal ($LiNbO_3$) doped with manganese ions ($Mn^{2+}$ and $Mn^{3+}$) and iron ions ($Fe^{2+}$ and $Fe^{3+}$). FIG. 1A shows the energy band diagram of this doubly-doped $LiNbO_3$. The $LiNbO_3$ crystal has a valence band 110 and a conduction band 120. The doped manganese and iron ions respectively have intermediate energy levels 130 and 140 laying between the bands 110 and 120.

The intermediate energy level 130 of Mn ions is separated from the conduction band 120 by a gap corresponding to a photon energy band in the UV spectrum. The intermediate energy level 140 of iron ions is separated from the conduction band 120 by a photon energy band in the red spectrum. Both types of ions have two different valence states: the manganese ions exist as $Mn^{2+}$ and $Mn^{3+}$ and the iron ions exist as $Fe^{2+}$ and $Fe^{3+}$. Electrons can be excited into the conduction band 120 from $Fe^{2+}$ either by visible light or by ultraviolet light, or from $Mn^{2+}$ by ultraviolet light only. Electrons in the conduction band 120 can recombine with ions $Fe^{3+}$ or $Mn^{3+}$.

Figure 1B:
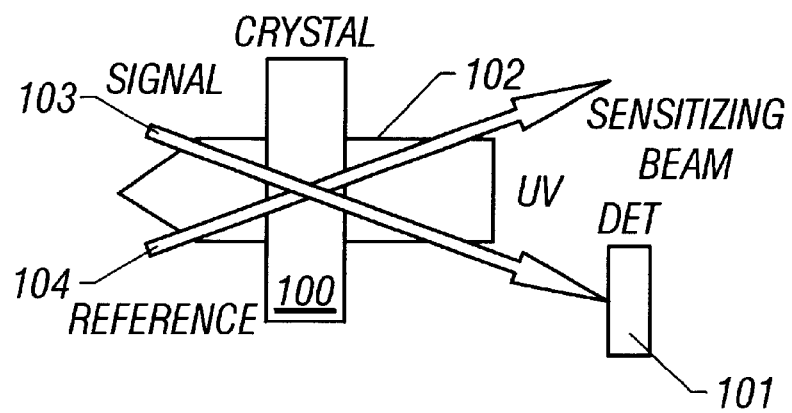
FIG. 1B schematically shows one embodiment of the optical configuration for recording data in the doubly-doped $LiNbO_3$ crystal.

FIG. 1B schematically shows one embodiment of the optical configuration for recording data in the doubly-doped $LiNbO_3$ crystal and reading the recorded data. Three optical beams 102, 103, and 104 are simultaneously used to record data in the crystal 100. The beam 102 is a sensitizing beam having a photon energy equal to or greater than the gap between energy levels 120 and 130. For manganese ions, the sensitizing beam 102 is in the UV spectrum. The sensitizing beam 102 may be generated by an incoherent light source. The beams 103 and 104 are coherent and interfere with each other to write a hologram in the crystal 100. Writing beams 103 and 104 have a wavelength in the red spectrum to excite electrons only from iron ions but not from manganese ions. Under simultaneous illumination of the beams 102, 103, and 104, the electrons in manganese ions are excited to the conduction band 120 by absorbing the UV sensitizing beam 102 and the electrons in the iron ions are excited to the conduction band 120 by absorbing not only the UV sensitizing beam 102 but also the red writing beams 103 and 104.

The excited electrons in the conduction band 120 can be recombined with either $Fe^{3+}$ ions or $Mn^{3+}$ ions. The recombination of the electrons with $Mn^{3+}$ ions transfers the information of the interference pattern into the manganese ions in the level 130. The excitation by the UV sensitizing beam 102 replenishes the ion sites and makes it possible to sustain and build up the holographic information in the two types of traps in both the level 140 and the level 130. When a saturation state is reached, the beams 102, 103, and 104 can be turned off to terminate the recording. Hence, the interference pattern formed by the two writing beams 103 and 104 produces a grating in the commonly-illuminated area within the $LiNbO_3$ crystal 100. This grating is formed by a sum of two space-charge patterns: a first space-charge field from a non-uniform spatial distribution of electrons in manganese ions and a second space-charge field from a non-uniform spatial distribution of electrons in ion ions.

The simultaneous illumination of the UV sensitizing beam 102 during the above recording process is essential to establish the first space-charge pattern in manganese traps. In absence of the UV sensitizing beam 102 during the recording, electrons of manganese ions in the level 130 cannot be excited to the conduction band 120 and hence cannot be transferred to the level 140 by recombining with the iron traps. This is because the wavelength of the writing beams 103 and 104 is selected to excite electrons to the conduction band 120 only from the iron ions in the level 140. However, under the illumination of the writing beams 103 and 104, all electrons in the level 140 will gradually transferred to the level 130 by recombination with manganese traps and will no longer be accessed by the writing beams 103 and 104 for holographic recording. If the UV light is initially used to excite the electrons in the level 130 to transfer them from the manganese traps to the iron traps via the conduction band 120 and then the UV light is turned off during the recording, electrons in the manganese traps cannot be available for recording. In addition, the writing beams 103 and 104 will transfer electrons from the iron sites to the manganese sites during the recording and hence further reduce the electron population available for recording.

The simultaneous presence of the sensitizing beam 102 and the writing beams 103 and 104 prevents the depletion of electrons from the iron ions and allows all electrons in both types of centers to participate in the recording. Hence, electrons in both types of centers can be repetitively excited until all electrons are spatially distributed according to the interference pattern formed by the writing beams 103 and 104 and the strength of the recorded grating reaches its maximum strength and becomes saturated.

This recording process may be monitored and controlled by using a photodetector 101 to measure the diffraction efficiency of the gratings. In FIG. 1B, the detector 101 is positioned to receive the transmission of the writing beam 103. During recording, the writing beam 103 can be blocked so that the writing beam 104 effects a read beam and is diffracted from the written grating in the direction of the blocked writing beam 103. Hence, the detector 101 can measure the power of the diffracted beam to determine the diffraction efficiency η which is the ratio between diffracted power and the incident power of the beam 104. The beam 103 can be blocked from time to time to monitor the diffraction efficiency η. Saturation of the diffraction efficiency η indicates the completion of the recording process.

To retrieve the stored information, a read beam at the same wavelength as the writing beams 103 and 104 is preferred over a read beam of a different wavelength in order to minimize loss or distortion of information. Such a read beam provides a spatially homogeneous illumination to the recorded grating and is diffracted to produce a reconstruction beam.

The first and second space-charge patterns both contribute the diffraction of the read beam to produce the reconstruction beam. But they are different from each other in that the second space-charge pattern formed in the iron traps can be erased by the uniform read beam after repetitive readout operations while the first space-charge pattern formed in the manganese traps is only partially erased. Thus, the first space-charge pattern in the deeper manganese traps persists and allows for the non-volatile holographic storage.

The uniform read beam at the same wavelength of the writing beams 103 and 104 can excite electrons to the conduction band 120 only from the iron ions in the level 140 but not from the manganese ions in the level 130. The excited electrons migrate in the conduction band 120 to different spatial locations and become trapped by either $Fe^{3+}$ or $Mn^{3+}$. The second space-charge pattern in the shallower ion traps, therefore, is erased in two different ways. First, the recombination of the excited electrons with manganese ions $Mn^{3+}$ transfers the electrons in the level 140 to manganese ions in the level 130 and partially erases the second space-charge pattern. Second, the recombination of the excited electrons with iron ions $Fe^{3+}$ in the level 130 reduces the spatial variation of the electron density in the level 130 and hence also erases the second space-charge pattern. Either one of these two processes can completely erase the second space-charge pattern.

Figure 2A:
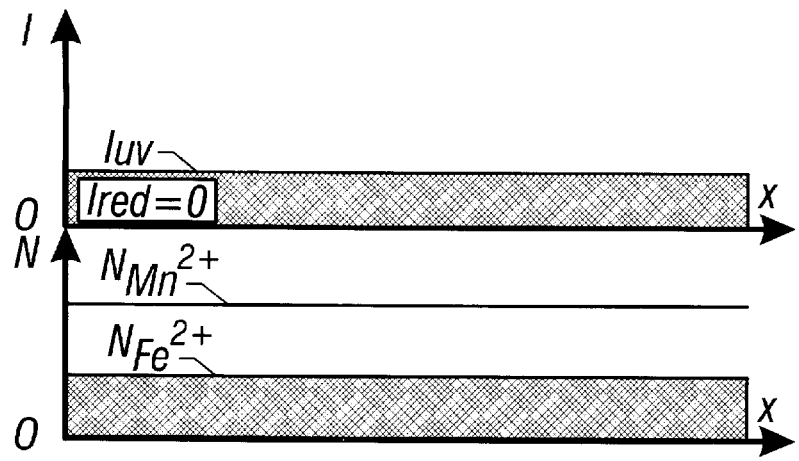
FIGS. 2A and 2B show optical intensities and charge carrier densities as a function of position in a recording process where a sensitizing beam and two writing beams simultaneously illuminate a doubly-doped photorefractive material.
Figure 2B:
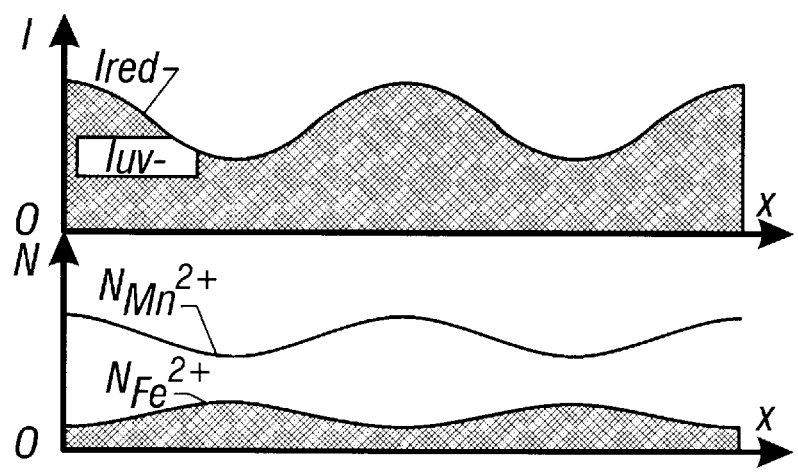
Figure 2C:
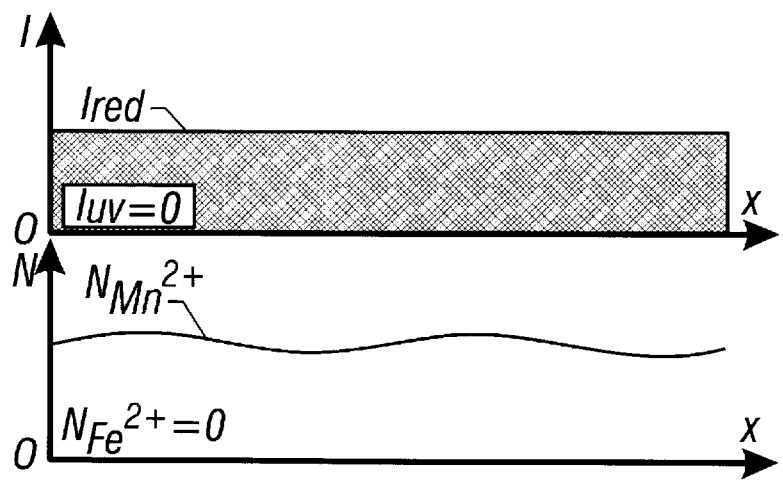
FIG. 2C shows optical intensities and charge carrier densities as a function of position during readout of the hologram recorded as in FIGS. 2A and 2B.

FIGS. 2A, 2B, and 2C illustrate the respective beam intensities and the charge carrier densities in the above recording and reading processes. The light intensities and the concentrations of electrons trapped in iron and manganese are shown as functions of the spatial coordinate x. FIG. 2A shows the illumination of the crystal by the homogeneous ultraviolet sensitizing light before the recording when electrons are trapped in both manganese and iron sites.

During recording (FIG. 2B), the red writing beams are used to illuminate the crystal which is simultaneously illuminated by the UV sensitizing light. The interference pattern formed by the red writing beams causes electrons to be excited from iron sites and moved back to manganese in the regions of interference maxima. The bulk photovoltaic currents, which are proportional to the product of light intensity and concentration of filled electron traps, create spatially inhomogeneous currents that contribute to build-up of the space-charge field. The homogeneous ultraviolet sensitizing light excites electrons from the modulated iron and manganese patterns, while modulated red light excites electrons only from iron. As the excited electron distribution and current pattern are replicas of the red-light intensity pattern, the distribution of the charge retrapped in manganese also stores the same pattern. The continuous presence of the ultraviolet light replenishes the iron sites and makes it possible to sustain and build up the transfer of information from iron to manganese.

After recording, the ultraviolet light is switched off. The red light initially removes the electrons from iron until all of the electrons are trapped in manganese, and read-out becomes non-volatile (FIG. 2C). However, optical erasure by homogeneous ultraviolet light is still possible.

Figure 3:
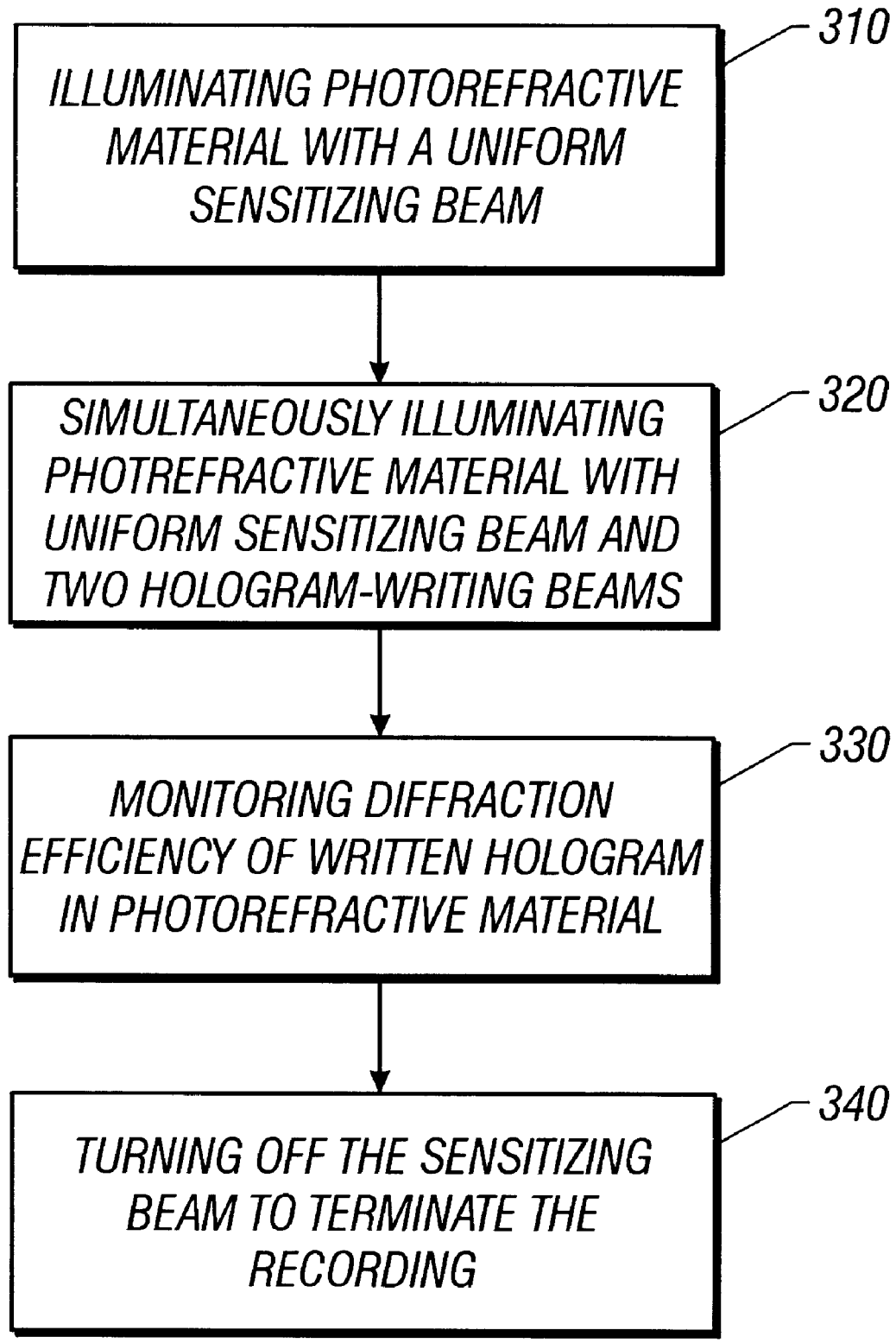
FIG. 3 is a flowchart showing steps of a recording process illustrated in FIGS. 2A and 2B.

FIG. 3 is a flowchart showing one embodiment of the recording process for the non-volatile holographic recording in a doubly-doped photorefractive crystal. At step 310, the crystal is illuminated by a sensitizing beam only. At step 320, writing beams are turned to simultaneously illuminate the crystal with the sensitizing beam. At step 330, the diffraction efficiency of the written gratings in the crystal is monitored. At step 340, the recording is completed by turning off all beams when the diffraction efficiency is saturated.

The above non-volatile holographic storage has been demonstrated by using a 0.85-mm-thick $LiNbO_3$ crystal doped with 0.075 wt % $Fe_2O_3$ and 0.01 wt % MnO. A 100-W mercury lamp is used to produce a unpolarized ultraviolet sensitizing beam at 365 nm with an intensity of about 20 mW $cm^{-2}$, and a 35-mW HeNe laser is used to generate two writing beams at 633 nm for holographic recording. The HeNe laser light is split into two plane waves which interfere at the crystal with each beam having a diameter of about 2.0 mm and an intensity of about 300 mW $cm^{-2}$. The grating vector of the interference pattern is aligned along the c axis of the sample.

Figure 4:
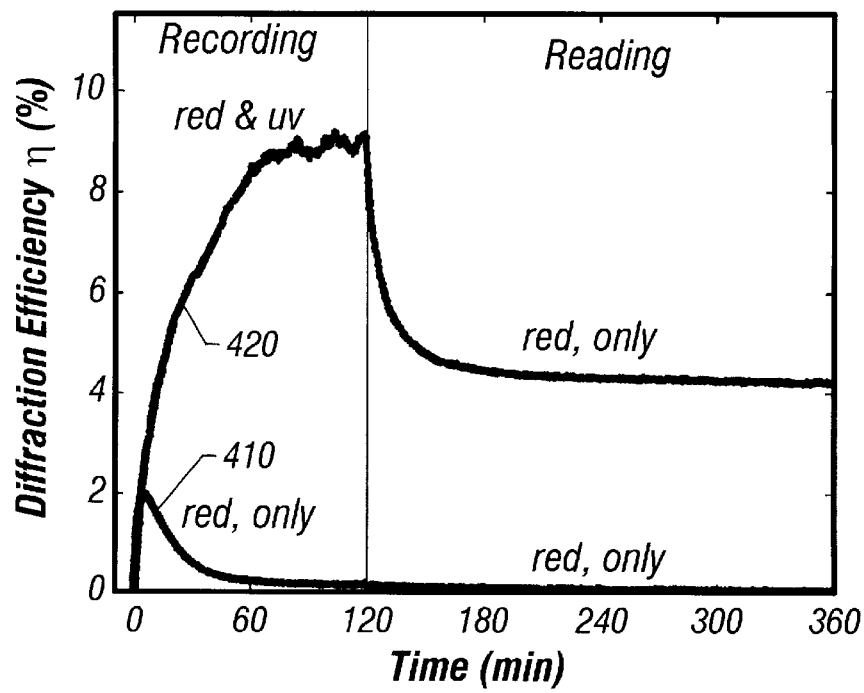
FIG. 4 shows measured diffraction efficiencies during both the recording and the reading processes by using a $LiNbO_3$ crystal that is doubly-doped with Fe and Mn traps.

FIG. 4 shows measured diffraction efficiencies during both the recording and the reading processes. The lower curve 410 shows the evolution of the diffraction efficiency when a hologram is recorded with the HeNe laser light beams only, without the UV sensitizing light. The crystal is prepared by a pre-exposure to the UV sensitizing light for about two hours before the recording. The diffraction efficiency increases rapidly to a maximum in a short period after the recording begins, and decreases afterwards almost to zero.

This phenomena may be explained as follows. The pre-exposure to the UV sensitizing light excites electrons from manganese centers and populates homogeneously the iron level. As the $Fe^{2+}$ ions can absorb red light, the HeNe laser records a hologram. Interference maxima yield large photovoltaic currents, which build up space-charge fields and refractive-index changes. However, the $Fe^{2+}$ sites become bleached in the high-intensity regions and the current drops. Ultimately, the darker regions are also bleached, and all electrons are trapped by the $Mn^{3+}$ ions. However, the achieved $Mn^{2+}$ concentration is almost completely spatially homogeneous because the initial $Fe^{2+}$ concentration is homogeneous at the beginning of the recording, and each excited carrier is moved in the same direction by approximately the same distance before it becomes retrapped by the $Mn^{3+}$ ions. Thus the final space-charge field is small and thus forms a low-efficiency grating. This recording process might not be suitable for efficient storage.

In contrast, the simultaneous illumination of the crystal with the ultraviolet during the recording significantly improves the strengths of the gratings. The upper curve 420 in FIG. 4 shows the result obtained by this recording process. The first observation is that much larger efficiencies are achieved during recording. In addition, read-out erases only a fraction of the hologram because electrons are removed from iron. However, after complete bleaching of the $Fe^{2+}$ sites, the hologram remains recorded in the manganese traps. From this stage on, the crystal is insensitive to red light and read-out is non-volatile. Extrapolation of a 12-hour reading experiment shows that continuous read-out of at least two weeks is possible until the diffraction efficiency drops further by a factor of 1/e. Measurements in the above system show a non-volatile diffraction efficiency of 4% for ordinarily polarized light and 32% for extraordinary polarization. The latter is due to a larger electro-optic coefficient.

It is desirable to multiplex a large number of holograms in a storage volume of a holographic storage material to achieve a high storage capacity. In practical devices, the number of holograms that can be multiplexed is measured by the parameter M/# which is approximately proportional to the square root of the saturation efficiency. A maximum M/# of about 0.6 is measured in the above 0.85-mm-thick crystal doped with 0.075 wt % $Fe_2O_3$ and 0.01 wt % MnO. Since M/# is proportional to the thickness of the recording material, a 1-cm-thick crystal with the new technique should yield M/#≈7. In comparison, typical values of M/# for volatile recording with green light in many singly iron-doped materials are about 1 for 1-cm thick crystals.

One aspect of the present doubly-doped photorefractive recording system is to achieve a high value of M/# without sacrificing the diffraction sensitivity. In the above sample crystal, the areal density of absorbed light energy required to achieve a diffraction efficiency of 1% is about 3.5 J $cm^{2-}$ in the red light. For a recording area of 1 $mm^2$ with a red read beam of 10 mW, the exposure time required to achieve diffraction efficiency equal to $10^{-6}$ is less than 35 ms, corresponding to a recording rate of about 30 $Mbits^{31\ 1}$. This recording rate is comparable to the typical recording rate obtained in singly ion-doped crystals which require an approximate areal density of absorbed light energy on the order of 1 J $cm^{-2}$ to achieve a diffraction efficiency of 1%.

The above sample crystal is produced for demonstrating the operation of the non-volatile storage in a doubly-doped photorefractive material. The parameters of the sample and the operating conditions are not adjusted to achieve the optimized performance. Many factors can affect the performance of such a system but the following guidelines may be observed to improve the performance.

The dopants in a doubly-doped photorefractive material should be selected so that the energy level of the deeper traps should not be very close to the valance band to reduce the band-to-band absorption of the sensitizing beam and the energy level of the shallower traps should not be very close to the conduction band to reduce the thermal excitation of the electrons from these traps to the conduction band. Large band-to-band absorption of the sensitizing beam reduces the maximum usable or effective thickness of the material although two or more sensitizing beams may be used to illuminate two or more sides of the material to increase the effective thickness. In addition, the frequency spacing between the energy levels of the traps should be as disjoint as possible in order to achieve a desired non-volatile behavior.

It has been discovered that the saturation space-charge field, refractive-index change and diffraction efficiency substantially depend on the ratio of the total intensity of the writing beams and the intensity of the sensitizing beam rather than their absolute values. In the example of the lithium niobate crystal doped with manganese and iron ions, if the total intensity of the writing beams is too high, the $Fe^{2+}$ sites are bleached to generate a low concentration of electrons in iron and the space-charge field approaches zero; however, if the total intensity of the writing beams is too low, the strong sensitizing beam can erase the spatial variation of the electron concentration and thus the space-charge field again approaches zero.

In general, the total intensity of the writing beams should be greater than that of the sensitizing beam by one order of magnitude. But the actual ratio of the intensities between the writing beams and the sensitizing beam may vary with the properties of the photorefractive material (e.g., the host crystal, the dopants, etc.) and the wavelengths of the writing and sensitizing beams. In the above example of recording data in a $LiNbO_3$ crystal doubly-doped with Fe and Mn traps, the total intensity of the writing beams in the read spectrum (e.g., from about 600 nm to about 700 nm) should be about 20 to 30 times greater than that of the sensitizing beam in the UV spectrum (e.g., from about 350 nm to about 420 nm). If the writing beams are green light in an approximate range from 500 nm to about 520 nm, the total intensity of the writing beams should be about 8 times greater than that of the UV sensitizing beam.

Figure 5:
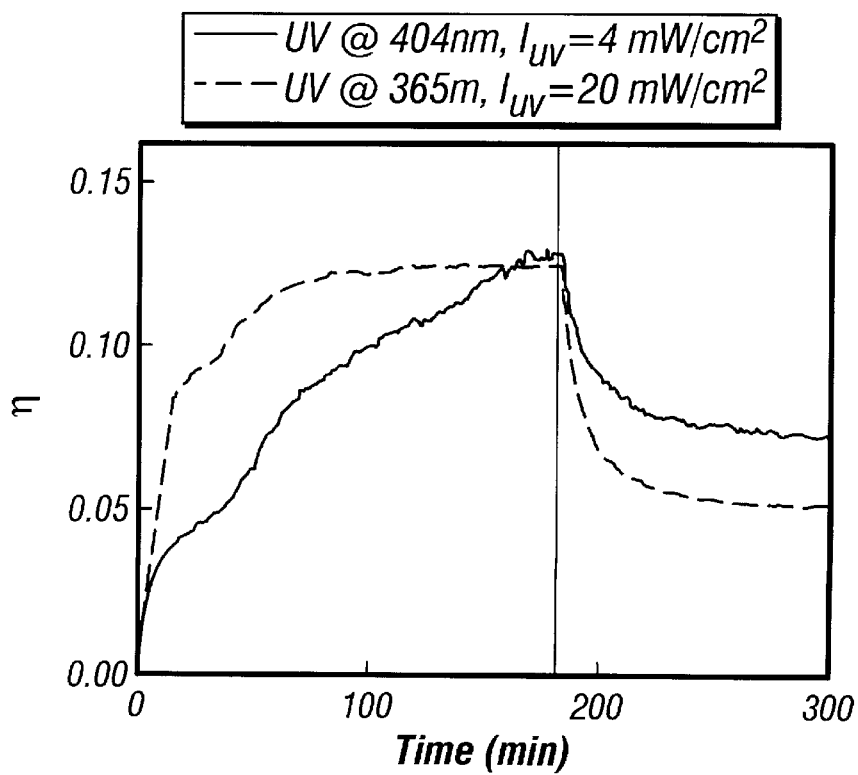
FIG. 5 shows measured diffraction efficiencies as a function of time during recording and reading processes for a $LiNbO_3$:Fe: Mn sample when the sensitizing UV beam are at two different wavelengths and power levels.

The sensitizing wavelength should be as long as possible to reduce the absorption of the sensitizing beam due to band-to-band excitation of the electrons (from valance band to the conduction band). On the other hand, the sensitizing wavelength should not be too long to cause poor sensitization. This depends on the position of the energy level of the deeper traps in the band gap of the material. For example, for Mn in $LiNbO_3$, the sensitizing wavelength should not be above 430 nm. FIG. 5 shows the recording and read-out curves for a $LiNbO_3$:Fe: Mn sample in the same system with different sensitizing wavelength. Use of a UV light at 404 nm produces a better M/# than that obtained by using a UV light at 365 nm light even with 5 times less intensity.

The wavelength of the writing beams should be as close as possible to the peak of the absorption band of the shallower traps. This condition can shorten the response time and increase the parameter M/#. However, the recording wavelength must be long enough not to excite electrons from the deeper traps. For some set of dopants, these two conditions might not be satisfied simultaneously. For example, the recording wavelength for $LiNbO_3$:Fe: Mn that corresponds to the peak of Fe absorption band is around 477 nm. However, complete non-volatile response can not be obtained with this wavelength because it causes excitation of electrons from Mn traps. In these situations, the sensitivity may be compromised for achieving non-volatile storage. Hence, a red light (e.g., 633 nm) is used to achieve excellent non-volatility with a reduced sensitivity.

The properties of the doubly-doped photorefractive materials can be optimized based on the special recording process where the writing beams and the sensitizing beam simultaneously illuminate a storage area. The parameter M/# will be optimized by adjusting several material parameters, including doping levels of the two different photorefractive centers, electron concentrations in each type of centers, and selections of dopants and host materials. In the following description, it is assumed that the intensity ratio of the writing beams and the sensitizing beam is approximately 30:1.

Figure 6A:
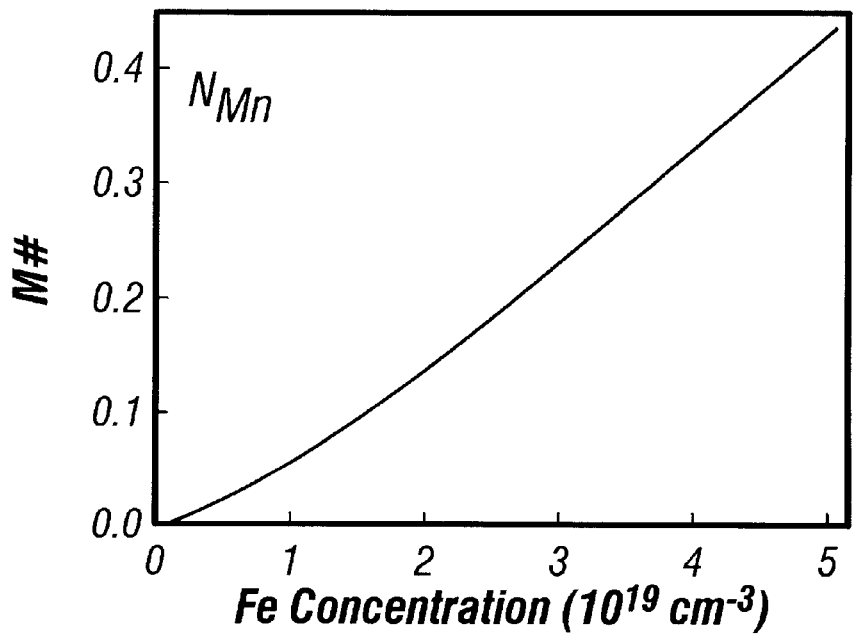
FIG. 6A shows a theoretical calculation of the parameter M/# for a $LiNbO_3$ crystal as a function of Fe concentration when Mn concentration is fixed at 0.01 wt. % for MnO.

FIG. 6A shows a theoretical calculation of the parameter M/# for a $LiNbO_3$ crystal as a function of Fe concentration when Mn concentration is fixed at 0.01 wt. % for MnO. It is assumed that 90% of the Mn traps are filled. All Fe traps are initially empty as is necessary for obtaining non-volatile recording. The highest level assumed for Fe concentration corresponds to 0.15 wt. % of $Fe_2O_3$ which is the highest useful doping level for Fe in $LiNbO_3$. No hologram can be recorded without having Fe traps, since the red writing beams can not excite electrons from Mn traps.

Increasing the concentration of Fe in the material increases the number of electrons that are transferred from the Mn traps into Fe traps via the conduction band due to the presence of the sensitizing beam. Therefore, holograms are recorded faster and to larger diffraction efficiencies. This increases the parameter M/#. If the concentration of Fe traps could be increased without an upper limit, the parameter M/# would eventually reach a maximum and then begin to decrease. However, in $LiNbO_3$ crystals, it is practically impossible to achieve such a high concentration of Fe traps to reach the maximum value of the parameter M/#. Therefore, to get the best M/#, the concentrations of the shallower traps should be as high as practically possible.

Figure 6B:
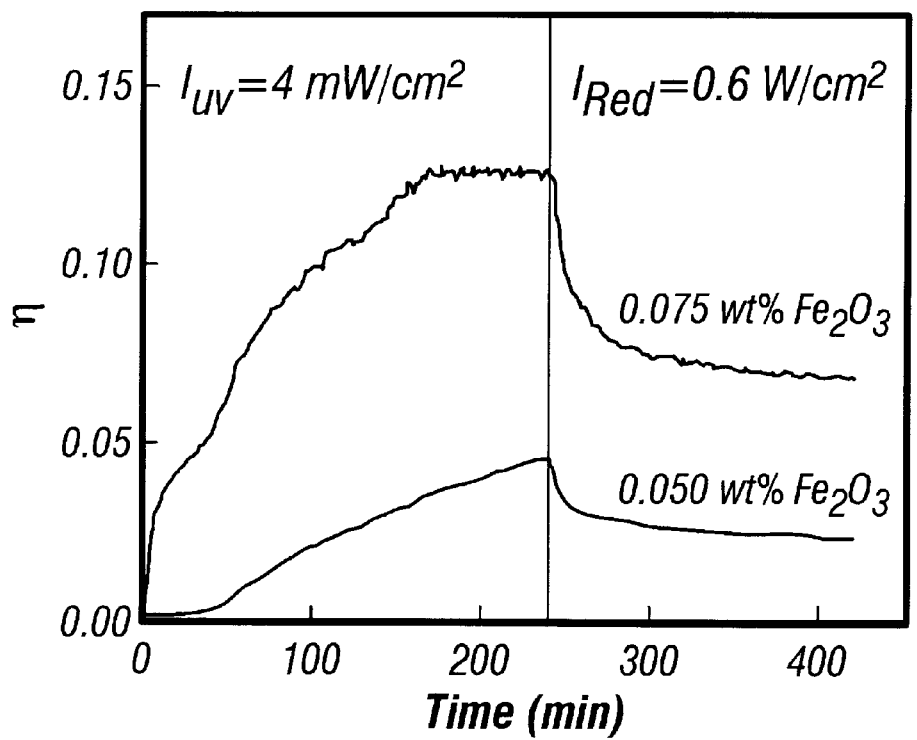
FIG. 6B shows measured diffraction efficiencies as a function of time during recording and reading processes for two $LiNbO_3$:Fe: Mn samples having the same Mn concentrations but different Fe concentrations.

FIG. 6B shows the recording and reading curves for two $LiNbO_3$ crystals having the same Mn concentrations, but different Fe concentrations. The crystals were annealed together for the same amount of time and in the same environment. The experiments were performed using the same setup, and with the same intensities for recording and sensitizing beams. The measurements suggest that the sample with 50% more Fe concentration generates a value of M/# that is nearly 50% better than the other sample with less Fe sites.

Figure 7A:
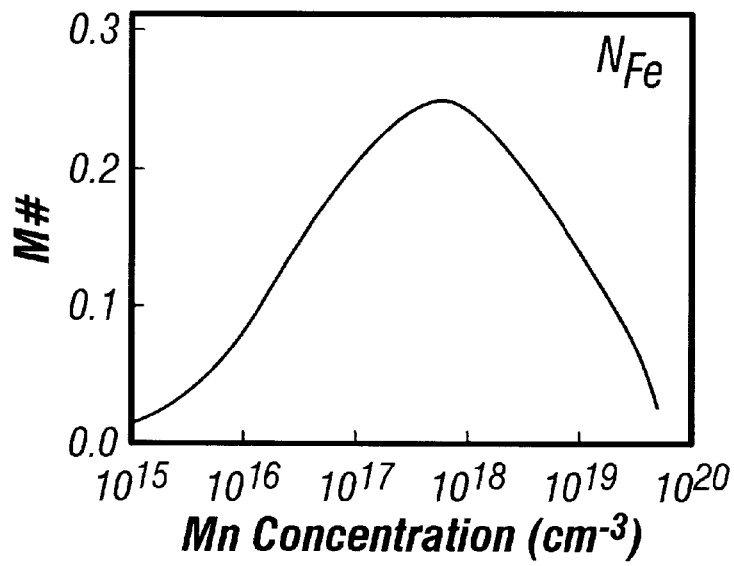
FIG. 7A shows a theoretical calculation of the parameter M/# of a $LiNbO_3$ crystal as a function of Mn concentration when Fe concentration is fixed at 0.075 wt. % for $Fe_2O_3$.

The concentration of the deeper traps (e.g., Mn in $LiNbO_3$) generally should be less than that of the shallower traps (e.g., Fe in $LiNbO_3$). FIG. 7A shows a theoretical calculation of the parameter M/# of a $LiNbO_3$ crystal as a function of Mn concentration when Fe concentration is fixed at 0.075 wt. % for $Fe_2O_3$. It is again assumed that 90% of the Mn traps are filled and all Fe traps are initially empty. The presence of Mn traps is essential as they provide electrons to the Fe traps that are necessary for holographic recording with red writing beams.

An increase in the concentration of Mn traps can lead two effects. On one hand, adding more Mn traps to the material and keeping 90% of them filled with electrons, more electrons can be provided for recording the hologram by sensitization. On the other hand, the empty Mn traps are also increased as the total number of Mn traps increases. This process decreases the population of electrons in the Fe traps by trapping more electrons from the Mn traps via the conduction band.

Figure 7B:
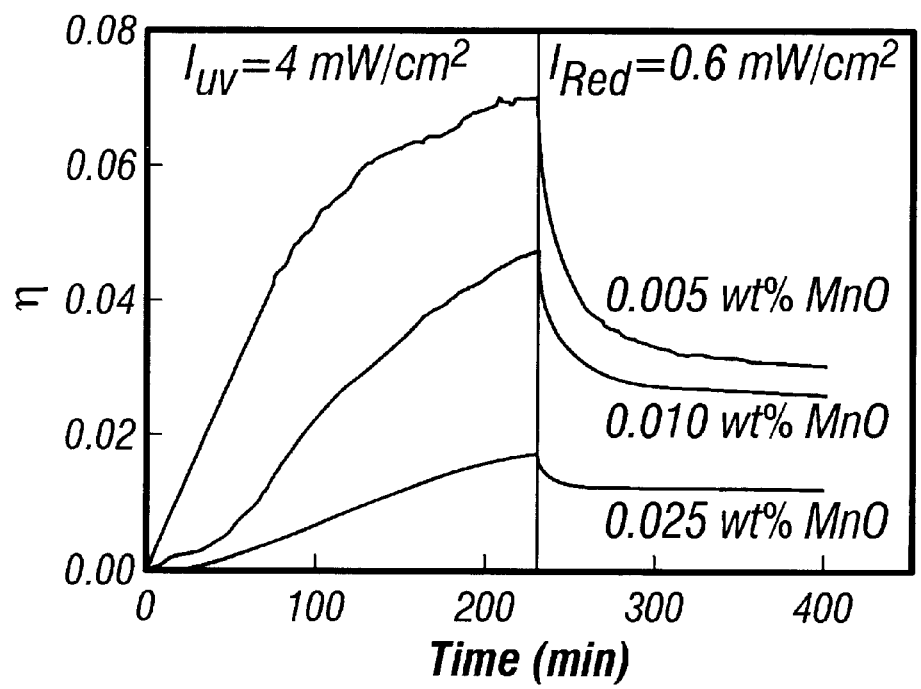
FIG. 7B shows measured diffraction efficiencies of samples that have different Mn concentrations.

These two effects of the Mn traps work against each other, and at some Mn concentration, come to a balance that results in the optimum M/#. FIG. 7A suggests that this optimized concentration of Mn traps is about 8–10% of that of the Fe traps. Measurements of diffraction efficiencies of samples at different Mn concentrations support the above conclusion as indicated by FIG. 7B.

In addition to the concentrations of two types of centers, the initial electron concentrations in the two different centers are also essential to optimize performance. In non-volatile storage based on a doubly-doped $LiNbO_3$ crystal, it is preferable that the final hologram be stored in Mn centers to persist against grating washout by red light during readout. Hence, it is preferable if all Fe traps are empty and only a portion of the Mn traps are filled with electrons.

The concentration of electrons in both traps can be varied by annealing. Heating the sample in Oxygen atmosphere to about 1000° C. (oxidation) is known to gradually reduce the electron concentrations in the traps. On the other hand, heating in Argon atmosphere at about 800° C. (reduction) can gradually increase the electron concentrations in the traps. Therefore, a proper annealing treatment can be used to achieve desired initial electron concentrations in the two different traps.

Figure 8A:
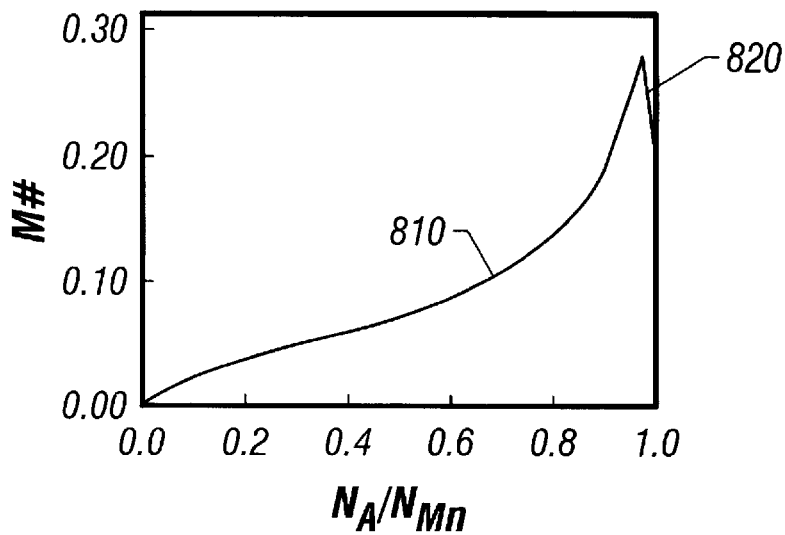
FIG. 8A shows a theoretical calculation of the parameter M/# of a doubly-doped $LiNbO_3$ crystal as a function of the portion of filled Mn traps when both Mn concentration and Fe concentration are fixed at 0.01 wt. % for MnO and 0.075 wt. % for $Fe_2O_3$, respectively.

FIG. 8A shows a theoretical calculation of the parameter M/# of a doubly-doped $LiNbO_3$ crystal as a function of the portion of filled Mn traps when both Mn concentration and Fe concentration are fixed at 0.01 wt. % for MnO and 0.075 wt. % for $Fe_2O_3$, respectively. By increasing the concentration of electrons in Mn traps, more electrons are provided for recording. This results in faster recording and larger M/# as indicated by the first portion 810 of the curve in FIG. 8A. However, if the electron concentration in Mn traps is so high that there are not sufficient empty Mn traps for recording the final non-volatile hologram, the strength of the hologram stored in Mn traps reduces. This is shown by the second portion 820 of the curve in FIG. 8A. The calculation suggests that about 95% of the Mn traps should be initially filled.

In an extreme case where all the Mn traps as well as a portion of the Fe traps are filled, a relatively large number of electrons are available for recording. This results in a fast recording to large diffraction efficiencies. However, when the so-recorded hologram is read out, the electrons are transferred gradually from Fe to Mn until all Mn traps become occupied with electrons. The remaining hologram is stored in Fe traps and is erased by further read-out.

Figure 8B:
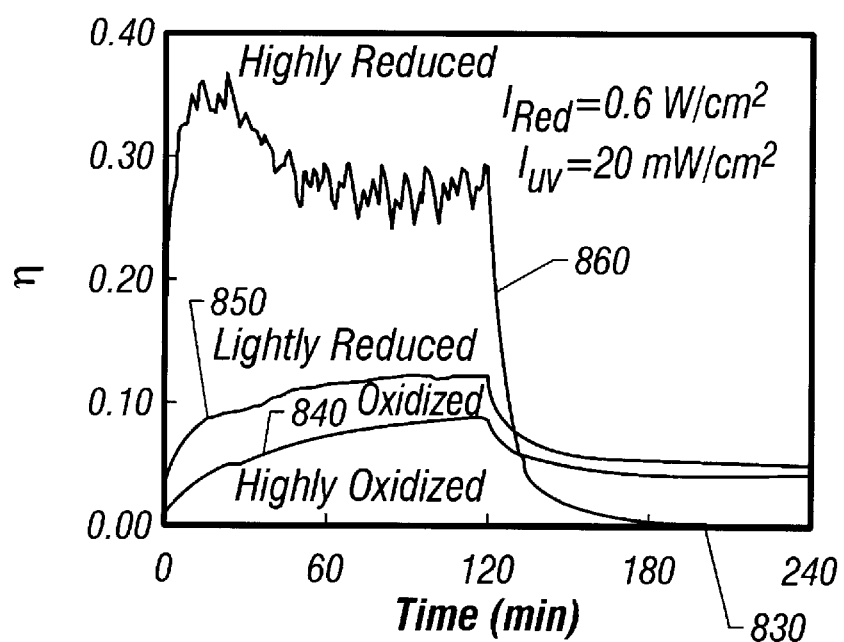
FIG. 8B shows the recording and reading curves for four doubly-doped $LiNbO_3$ crystals having the same Fe and Mn concentrations, but different oxidation/reduction states.

FIG. 8B shows the recording and reading curves for four crystals having the same Fe and Mn concentrations, but different oxidation/reduction states. The parameter M/# of the heavily oxidized sample indicated by curve 830 that has hardly any electrons in either one of the traps is very small. Curves 840 and 850 represent measured values of M/# for an oxidized sample with about 90% of the Mn traps filled and a lightly reduced samples with about 95% of the Mn traps filled, respectively. These two samples exhibit sufficient values of the parameter M/#. The measured data for a heavily oxidized sample is shown by curve 860. Nearly all Mn traps and part of its Fe traps are filled with electrons due the heavy oxidization. The initial recording in such a crystal is very fast, and the obtained diffraction efficiency is large, but the final diffraction efficiency after sufficient read-out is zero due to the storage of final hologram in Fe traps instead of Mn traps.

Therefore, in general, there is an optimum annealing state for the doubly-doped crystal to get the best persistent M/#. This annealing state occurs when all the shallower traps are empty, and only a portion of the deeper traps is filled. For a $LiNbO_3$:Fe: Mn sample, a preferred annealing state should fill 95% of the Mn traps with electrons.

Figure 9:
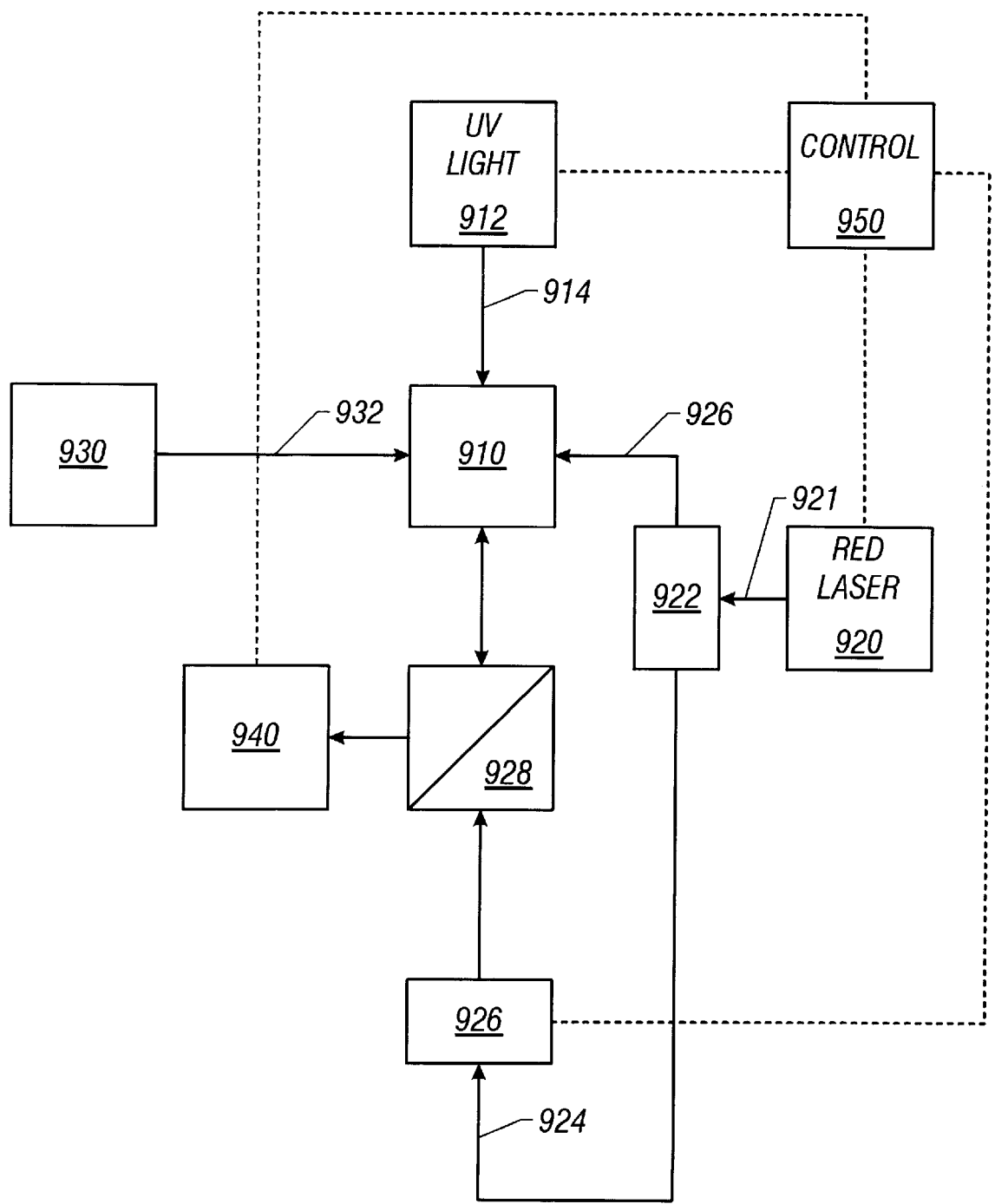
FIG. 9 is a block diagram of a non-volatile holographic device based on a doubly-doped photorefractive material, where solid lines with arrows represent optical beams and dashed lines represent electrical connections.

FIG. 9 shows one embodiment of a holographic device 900 based on a doubly-doped photorefractive crystal 910. A laser 920 is located near the crystal 910 and produces a laser beam 921. An optical module 922 receives the beam 921 to produce two mutually coherent beams 924 and 926 as writing beams. A spatial light modulator 924 modulates the beam 924 to produce a signal beam. Beams 924 and 926 overlap each other in the crystal 910 to produce an interference pattern. A light source 912, located close to the crystal 910, produces a sensitizing beam 914 which has a wavelength shorter than the laser beam 921. A control unit 950 connected to the laser 920 and the light source 912 to control their operations.

An optical element 930 is located near the crystal 910 to produce a read beam 932 by using a portion of the reference beam 926. The element 930 may be a phase conjugator that receives the transmitted reference beam 926 and produces the phase conjugation of the reference beam 926 as the read beam 932. A beam splitter 928 receives a construction beam generated by the crystal 910 by diffracting the read beam 932 and directs the construction beam to a detector 940. A beam steering unit may be placed in the optical path of the reference beam 926 to control the incident angle of the reference beam to the crystal 910 so that multiple holograms can be multiplexed within the crystal 910.

In recording a hologram, the control unit 950 controls the laser 920 and the UV light source 912 to simultaneously illuminate the crystal 910 with the UV sensitizing beam 914 and the writing beams 924, 926. Upon completion of recording, the sensitizing beam 914 is turned off and the stored information can be read out.

The information stored in the crystal 910 may be erased by illuminating the crystal 910 with the sensitizing beam 914 alone. Hence, the device 900 can be used as an optical write-many and read-many memory.

Although the present invention has been described in detail with reference to a few embodiments, various modifications and enhancements may be possible. For example, other transition metal ions can be used to replace Mn as the deep traps in $LiNbO_3$, including Cu, Cr, or Fe. The shallow traps of Fe may be replaced by Ce and Ru. Hence, a $LiNbO_3$ crystal may be doped with cerium and copper as a nonvolatile storage medium. Materials other than $LiNbO_3$ may also be used such as $LiTaO_3$ which has a larger band gap than $LiNbO_3$. These and other variations are intended to be encompassed by the following claims.

What is claimed is:

1. A method for recording information in an optical material, comprising:

preparing the optical material to have first and second types of dopants that are operable to produce charge carriers to a common band in response to radiation of specified wavelengths and to recombine with charge carriers in said common band, said first type of dopants having a first dopant energy level below said common band by a first energy gap greater than a second energy gap of a second dopant energy level of said second type of dopants below said common band;

illuminating the optical material by a sensitizing beam of a first wavelength to simultaneously excite charge carriers from both said first and second types of dopants to said common band; and illuminating the optical material by a signal beam and a reference beam of a second wavelength that is longer than said first wavelength and exciting only charge carriers from said second type of dopants to said common band, said signal and reference beams producing an interference pattern in the optical material, simultaneously illuminating the optical material by said sensitizing beam, said signal beam, and said reference beam to produce a spatial charge carrier distribution indicative of said interference pattern and storing information carried by said signal beam.

2. A method as in claim 1, wherein said optical material includes a photorefractive crystal.

3. A method as in claim 1, wherein said first type of dopants includes ions of a first element and said second type of dopants includes ions of a second element different from said first element.

4. A method as in claim 3, wherein said first type of dopants includes at least two different kinds of ions of said first element and said second type of dopants includes two different kinds of ions of said second element.

5. A method as in claim 1, further comprising configuring the optical material in a way that said first and second gaps are greater than a thermal excitation energy associated with the optical material so as to prevent thermal excitation of charge carriers from said first and second dopants to said common band.

6. A method as in claim 1, further comprising selecting said first and second types of dopants so that charge carriers in said second type of dopants do not relax to said first type of dopants in absence of photon excitation.

7. A method as in claim 1, wherein said optical material has a ground energy level below said common band by a third energy gap greater than said first energy gap and said first wavelength of said sensitizing beam is longer than a wavelength associated with a photon energy equal to said third energy gap.

8. A method as in claim 1, further comprising adjusting at least one parameter of said signal and reference beams to produce a plurality of holograms in a same volume within the optical material that is simultaneously illuminated by said sensitizing beam.

9. A method as in claim 8, wherein said parameter includes an angle of said reference beam.

10. A method as in claim 1, further comprising illuminating the optical material with a read beam to read said stored information in absence of said sensitizing beam and said signal and reference beams, said read beam having a photon energy that excites charge carriers only from said second type of dopants but not from said first type of dopants.

11. A method as in claim 1, wherein the optical material comprises a lithium niobate crystal doped with manganese ions as said first type of dopants and iron ions as said second type of dopants.

12. A method as in claim 1, wherein the optical material comprises a lithium niobate crystal doped with copper ions as said first type of dopants and cerium ions as said second type of dopants.

13. An optical data storage device, comprising:

a holographic material doped with first and second types of dopants that are operable to produce charge carriers to a common band in response to radiation of specified wavelengths, said first type of dopants having a first dopant energy level below said common band by a first energy gap greater than a second energy gap of a second dopant energy level of said second type of dopants below said common band;

a first radiation source, disposed relative to said holographic material and operable to produce a first beam of a first wavelength to illuminate a location of said holographic material, said first beam having a photon energy to excite charge carriers from both said first and second types of dopants to said common band;

a second radiation source, disposed relative to said holographic material and operable to produce a second beam of a second wavelength that is longer than said first wavelength and exciting only charge carriers from said second type of dopants to said common band;

an optical coupling module disposed relative to said holographic material and said second radiation source to receive said second beam, said optical coupling module producing a signal beam and a reference beam from said second beam and directing said signal and reference beams to overlap in said location of said holographic material, said signal and reference beams being coherent with each other to produce an interference pattern in said location;

a light modulator, disposed in an optical path of said signal beam and operable to modulate said signal beam to superimpose information on said signal beam; and a control unit connected to control said first radiation source, said second radiation source, said optical coupling module, and said light modulator to control simultaneous illumination of said location of said holographic material by said first beam, said signal beam, and said reference beam and produce a spatial charge carrier distribution indicative of said interference pattern and storing said information carried by said signal beam.

14. A device as in claim 13, wherein said holographic material comprises a photorefractive crystal.

15. A device as in claim 14, wherein said holographic material comprises a lithium niobate crystal doped with manganese ions as said first type of dopants and iron ions as said second type of dopants.

16. A device as in claim 14, wherein said holographic material comprises a lithium niobate crystal doped with copper ions as said first type of dopants and cerium ions as said second type of dopants.

17. A device as in claim 13, wherein said first type of dopants includes ions of a first element and said second type of dopants includes ions of a second element different from said first element.

18. A device as in claim 17, wherein said first type of dopants includes at least two different kinds of ions of said first element and said second type of dopants includes two different kinds of ions of said second element.

19. A device as in claim 13, wherein said first and second gaps are greater than a thermal excitation energy associated with said holographic material so as to prevent thermal excitation of charge carriers from said first and second dopants to said common band.

20. A device as in claim 13, wherein said first and second types of dopants are configured so that charge carriers in said second type of dopants do not relax to said first type of dopants in absence of photon excitation.

21. A device as in claim 13, wherein said holographic material has a ground energy level below said common band by a third energy gap greater than said first energy gap and said first radiation source is configured so that said first wavelength is longer than a wavelength associated with a photon energy equal to said third energy gap.

22. A device as in claim 13, wherein said optical coupling module is operable to adjust at least one parameter of said signal and reference beams to produce a plurality of holograms in said location of said holographic material that is simultaneously illuminated by said first beam.

23. A device as in claim 13, wherein said light modulator is a spatial light modulator.

24. A device as in claim 13, wherein said first radiation source produces incoherent radiation.

25. A device as in claim 13, wherein said optical coupling module is operable to produce a read beam from said second beam and said control unit is operable to allow illumination of said location by said read beam in absence of said first beam and said signal and reference beams so that said read beam excites charge carriers only from said second type of dopants but not from said first type of dopants and to acquire said stored information for readout.

26. A device as in claim 25, wherein said read beam is incident to said location of said holographic material in an opposite direction of said reference beam.

* * * * *

UNITED STATES PATENT AND TRADEMARK OFFICE
CERTIFICATE OF CORRECTION

PATENT NO. : 6,157,470
DATED : December 5, 2000
INVENTOR(S) : Karsten Buse, Ali Adibi and Demetri Psaltis It is certified that error appears in the above-identified patent and that said Letters Patent is hereby corrected as shown below:

Column 1,
Line 8, before "FIELD OF THE INVENTION", please insert the following paragraph:

-- STATEMENT AS TO FEDERALLY-SPONSORED RESEARCH

The U.S. Government has certain rights in this invention pursuant to Grant No. F30602-97-C-0049 awarded by the U.S. Air Force. In addition, the invention described herein was made in the performance of work under NASA Contract 7-1260, and is subject to the provisions of Public Law 96-517 (U.S.C. 202) in which the Contractor has elected to retain title. --

Signed and Sealed this

Twentieth Day of November, 2001

*Attest:*

*Nicholas P. Godici*

*Attesting Officer*

NICHOLAS P. GODICI
*Acting Director of the United States Patent and Trademark Office*